(12) United States Patent
van Manen et al.

(10) Patent No.: US 8,467,265 B2
(45) Date of Patent: Jun. 18, 2013

(54) INTERPOLATION AND DEGHOSTING OF SEISMIC DATA ACQUIRED IN THE PRESENCE OF A ROUGH SEA

(75) Inventors: Dirk-Jan van Manen, Reigate (GB); Massimiliano Vassallo, Brighton (GB)

(73) Assignee: WesternGeco L.L.C., Houston, TX (US)

( * ) Notice: Subject to any disclaimer, the term of this patent is extended or adjusted under 35 U.S.C. 154(b) by 622 days.

(21) Appl. No.: 12/693,683

(22) Filed: Jan. 26, 2010

(65) Prior Publication Data
US 2011/0182139 A1    Jul. 28, 2011

(51) Int. Cl.
*G01V 1/38* (2006.01)
(52) U.S. Cl.
USPC ............. 367/24; 367/20; 367/21; 702/17
(58) Field of Classification Search
USPC ............. 367/20, 21, 24; 702/14, 17
See application file for complete search history.

(56) References Cited

U.S. PATENT DOCUMENTS

| | | | |
|---|---|---|---|
| 5,193,077 A | 3/1993 | Weiglein et al. | |
| 6,775,618 B1 * | 8/2004 | Robertsson et al. | 702/14 |
| 7,379,385 B2 | 5/2008 | Ferber | |
| 7,715,988 B2 * | 5/2010 | Robertsson et al. | 702/17 |
| 2007/0025182 A1 | 2/2007 | Robertsson | |
| 2008/0165618 A1 | 7/2008 | Robertsson | |
| 2008/0275649 A1 | 11/2008 | Ozdemir et al. | |
| 2009/0245021 A1 | 10/2009 | Robertsson et al. | |

FOREIGN PATENT DOCUMENTS
WO    WO 2005114258 A1 * 12/2005

OTHER PUBLICATIONS

Lasse Amundsen, Wavenumber-Based Filterig of Marine Point-Source Data, Geophysics, Sep. 1993, pp. 1335-1348, vol. 58, No. 9.
B. J. Posthumus, Deghosting using a Twin Streamer Configuration, Geophysical Prospecting, 1993, pp. 267-286, vol. 41.
Sonneland, L., Berg, L. E., Eidsvig, P., Haugen, A., Fotland, B., and Vestby, J., 2-D Deghosting Using Vertical Receiver Arrays, EAGE Extended Abstract, 1986, S11.6.
International Search Report of PCT Application No. PCT/US2011/022500 dated Aug. 30, 2011.

* cited by examiner

*Primary Examiner* — Isam Alsomiri
*Assistant Examiner* — Daniel L Murphy

(57) ABSTRACT

A technique for processing seismic data acquired in a seismic survey conducted in the presence of a rough sea includes receiving a first dataset that is derived from data acquired by a first set of seismic sensors generally towed at a first depth in the seismic survey and receiving a second dataset that is derived from data acquired by a second set of seismic sensors generally towed at a second depth that is different than the first depth in the seismic survey. The first dataset is indicative of at least pressure measurements, and the second dataset is indicative of at least crossline particle motion measurements. The technique includes determining crossline particle motion measurements in the presence of a relatively flat sea surface based at least in part on the crossline measurements that are indicated by the second dataset and the pressure measurements that are indicated by the first dataset.

20 Claims, 9 Drawing Sheets

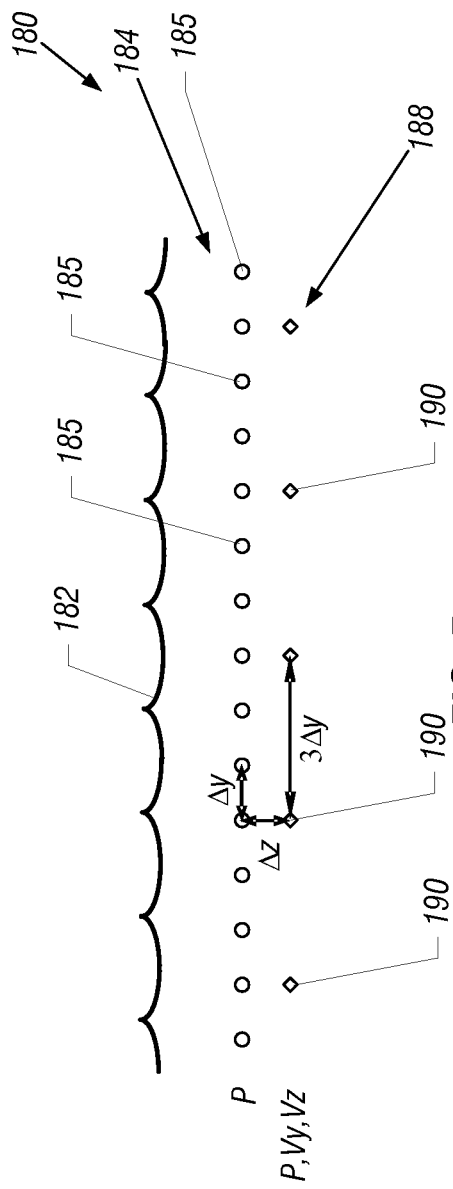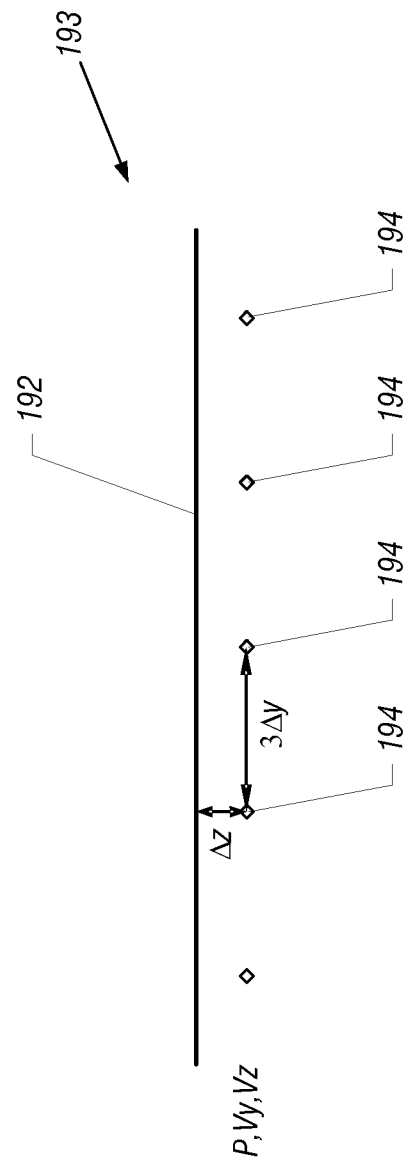

INTERPOLATION AND DEGHOSTING OF SEISMIC DATA ACQUIRED IN THE PRESENCE OF A ROUGH SEA

BACKGROUND

The invention generally relates to interpolation and deghosting of seismic data acquired in the presence of a rough sea.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique for processing seismic data acquired in a seismic survey conducted in the presence of a rough sea includes receiving a first dataset that is derived from data acquired by a first set of seismic sensors generally towed at a first depth in the seismic survey and receiving a second dataset that is derived from data acquired by a second set of seismic sensors generally towed at a second depth that is different than the first depth in the seismic survey. The first dataset is indicative of at least pressure measurements, and the second dataset is indicative of at least crossline particle motion measurements. The technique includes determining crossline particle motion measurements in the presence of a relatively flat sea surface based at least in part on the crossline measurements that are indicated by the second dataset and the pressure measurements that are indicated by the first dataset.

In another embodiment of the invention, a system to process seismic data acquired in a seismic survey conducted in for the presence of a rough sea includes an interface and a processor. The interface receives a first dataset that is derived from data acquired by a first set of seismic sensors generally towed at a first depth in the seismic survey and a second dataset, which is derived from data acquired by a second set of seismic sensors generally towed at a second depth that is different than the first depth in the seismic survey. The first dataset is indicative of at least pressure measurements, and the second dataset is indicative of at least crossline particle motion measurements. The processor processes the first and second datasets to determine crossline particle motion measurements in the presence of a relatively flat sea surface based at least in part on the crossline measurements indicated by the second dataset and the pressure measurements indicated by the first dataset.

In yet another embodiment of the invention, an article includes a computer readable storage medium that stores instructions that when executed by a computer cause the computer to process seismic data acquired in a seismic survey conducted in the presence of a rough sea. The instructions when executed by the computer cause the computer to receive first and second datasets. The first dataset is derived from data acquired by a first set of seismic sensors generally towed at a first depth in the seismic survey, and the second dataset is derived from data acquired by a second set of seismic sensors generally towed at a second depth that is different than the first depth in the seismic survey. The first dataset is indicative of at least pressure measurements, and the second dataset is indicative of at least crossline particle motion measurements. The instructions when executed further cause the computer to process the first and second datasets to determine crossline particle motion measurements in the presence of a relatively flat sea surface based at least in part on the crossline measurements that are indicated by the second dataset and the pressure measurements that are indicated by the first dataset.

Advantages and other features of the invention will become apparent from the following drawing, description and claims.

BRIEF DESCRIPTION OF THE DRAWING

FIGS. 5 and 8 are illustrations of exemplary streamer spreads that may be used to acquire seismic measurements in the presence of a rough sea according to embodiments of the invention.

FIG. 6 is an illustration of a streamer spread in a flat sea, which is equivalent to the streamer spread of FIG. 5 when rough sea-to-flat sea processing techniques are used according to an embodiment of the invention.

DETAILED DESCRIPTION

Figure 1:
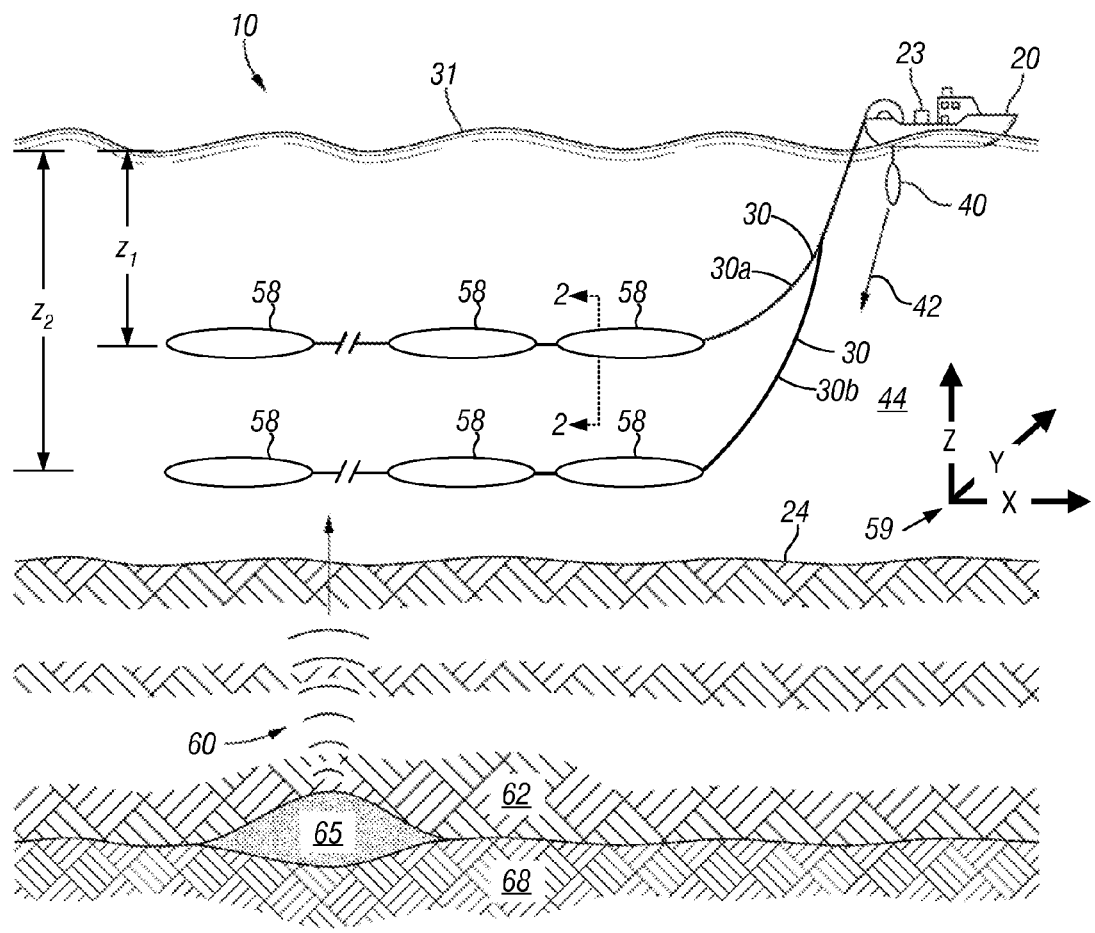
FIG. 1 is a schematic diagram of a marine-based seismic data acquisition system according to an embodiment of the invention.

FIG. 1 depicts an embodiment 10 of a marine seismic data acquisition system in accordance with some embodiments of the invention. In the system 10, a survey vessel 20 tows a spread of seismic streamers 30. For the arrangement depicted in FIG. 1, the seismic spread is an over/under spread, which includes at first set of one or more streamers 30*a* (one streamer 30*a* being depicted in FIG. 1) that are towed at a first depth (called "$z_1$" in FIG. 1) and a second set of one or more streamers 30*b* (one streamer 30*b* being depicted in FIG. 1) that are towed at a deeper depth (called "$z_2$" in FIG. 1). The seismic streamers 30 may be several thousand meters long and may contain various support cables (not shown), as well as wiring and/or circuitry (not shown) that may be used to support communication along the streamers 30. In general, each streamer 30 includes a primary cable into which are mounted seismic sensors 58 that record seismic signals.

In accordance with embodiments of the invention, the seismic sensors 58 may be pressure sensors only or may be multi-component seismic sensors, which sense pressure and particle motion. As described further below, the upper streamer(s) 30*a* contain at least pressure sensors, and the lower streamer(s) 30*b* contain at least crossline particle motion sensors (sensors that serve the crossline component of a particle velocity, for example).

For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction; another one of the pressure gradient sensors may acquire, at a particular point, seismic data indicative of the partial derivative of the pressure data with respect to the inline direction; and another one of pressure gradient sensors may acquire, at a particular point, seismic data indicative of the partial derivative of the pressure data with respect to the vertical direction.

Among its other features, the marine seismic data acquisition system 10 includes a seismic source 40 that may be formed from one or more seismic source elements, such as air guns, for example, which are connected to the survey vessel 20. Alternatively, in other embodiments of the invention, the seismic source 40 may operate independently of the survey vessel 20, in that the seismic source 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the source(s) 40 produce corresponding reflected acoustic signals, or pressure waves 60, which are sensed by the seismic sensors of the seismic sensor unit 58. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The system 10 may be used to acquire seismic measurements in a survey that is conducted in the presence of a rough sea. The perturbations experienced by the seismic sensors due to the rough sea may lead to interpretation errors if the rough sea effects are not taken into account. Techniques and systems are described herein to transform pressure and particle motion datasets that are acquired in a survey that is conducted in the presence of a rough sea into corresponding datasets that are associated with a flat sea surface. The resulting flat sea datasets may be interpolated and deghosted as if the rough sea perturbations never occurred.

Still referring to FIG. 1, for the following discussion, it is assumed that the seismic spread is an over/under spread that has pressure sensors that are located on both the upper set of streamers 30*a* (towed at a depth $z_1$) and on the lower set of streamers 30*b* (towed at a depth $z_2$). The pressure measurements from these two depths $z_1$ and $z_2$ may be processed for purposes of transforming the pressure measurements into flat sea pressure measurements. More specifically, in accordance with embodiments of the invention, in the frequency-wavenumber domain, an equivalent flat sea pressure dataset may be expressed as follows:

$$P^{FLAT}(z_2-z_1)=P(z_2)-W_D(z_2,z_1)P(z_1), \qquad \text{Eq. 1}$$

where "$P^{FLAT}(z_2-z_1)$" represents the equivalent flat sea pressure; "$P(z_2)$" represents the actual pressure measurements acquired at the deeper depth $z_2$; "$P(z_1)$" represents the actual pressure measurements acquired at the shallower depth $z_1$; and "$W_D(z_2,z_1)$" represents a one way redatuming propagator, which is defined as follows:

$$W_D(z_1,z_2)=\exp(-i\sqrt{k^2-k_x^2-k_y^2}\Delta z). \qquad \text{Eq. 2}$$

In Eq. 2, "$k_x$" represents the inline, or x, radial wavenumber; "$k_y$" represents the crossline, or y, radial wavenumber; "$\Delta z$" represents the difference in depths ($z_2$ less $z_1$); and "$k^2$" represents the squared radial wavenumber, which may be expressed as follows:

$$k^2=k_x^2+k_y^2+k_z^2=(\omega/c)^2, \qquad \text{Eq. 3}$$

where "$\omega$" represents radial frequency; and "$c$" represents the speed of sound in water.

Pursuant to Eqs. 1, 2 and 3, the flat sea pressure dataset may be derived as follows. First, the one way redatuming operator $W_D$ is applied to the total pressure wavefield that is recorded at depth $z_1$. The redatuming operator $W_D$ delays, or shifts, the downgoing pressure waves indicated by the pressure measurements $P(z_1)$ to depth $z_2$, provided there is no crossline aliasing, and the streamer separation is constant. The application of the one way operator $W_D$ to the $P(z_1)$ pressure measurement produces a shifted pressure measurement, which contains the rough sea perturbations that are present in the $P(z_2)$ pressure measurements. Therefore, by subtracting the redatumed measurements from the pressure measurements $P(z_2)$, the rough sea perturbations may be removed.

It is noted that the angle dependent delay between the upgoing waves measured by the lower streamer(s) 30b and the shifted upgoing waves derived from the upper streamer measurements is exactly doubled. Therefore, even though the downgoing waves cancel when these two datasets are subtracted, the upgoing waves do not cancel. However, the upgoing waves do not cancel and are recorded with opposite polarity and an angle dependent time delay that corresponds to twice the streamer separation between them. This produces an equivalent flat sea dataset with a pseudo notch as if the data had been recorded at a streamer depth equal to the streamer separation. The notch may be subsequently narrowed through division with the flat sea reflection operator for a depth that is equal to the streamer separation.

Figure 2:
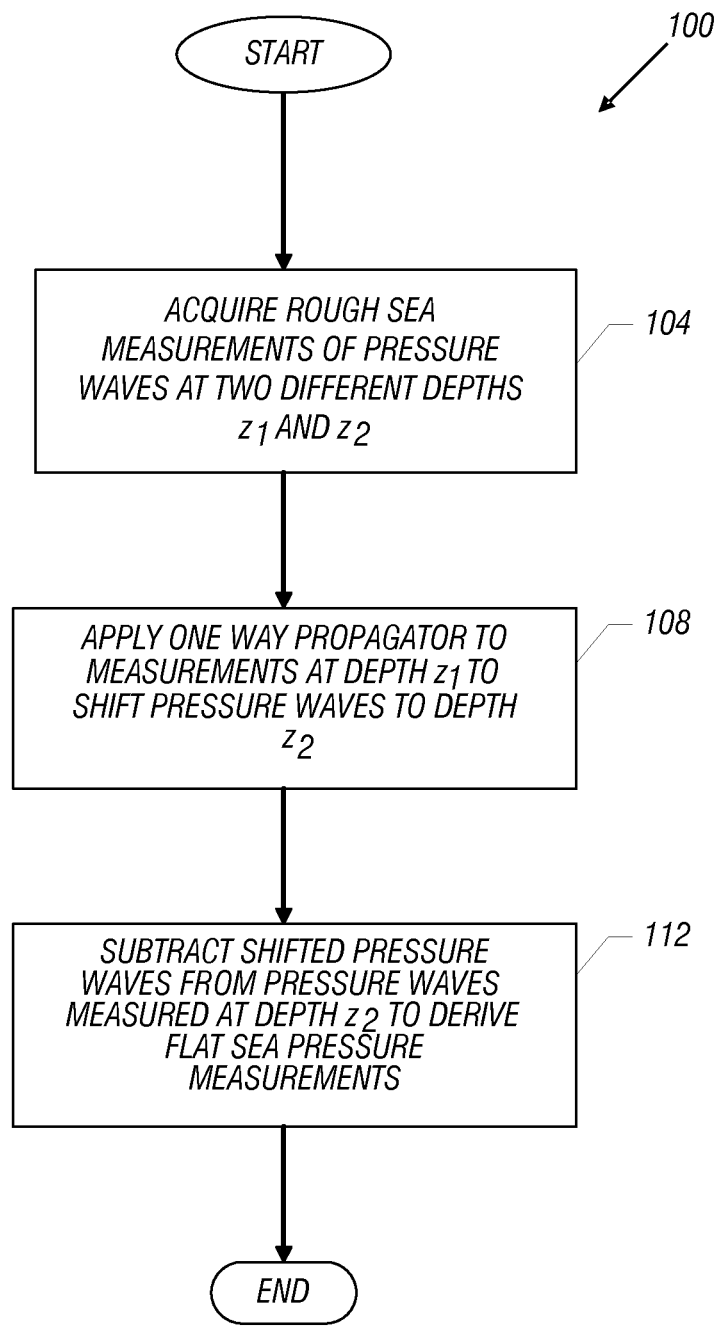
FIG. 2 is a flow diagram depicting a technique to determine flat sea pressure measurements from pressure measurements acquired in the presence of a rough sea.

Referring to FIG. 2, to summarize, a technique 100 may be used for purposes of transforming pressure measurements acquired in the presence of a rough sea to flat sea pressure measurements. Pursuant to the technique 100, rough sea measurements of pressure waves are acquired (block 104) at two different depths $z_1$ and $z_2$. A one way propagator is applied (block 108) to the measurements at the depth $z_1$ to shift the pressure waves to depth $z_2$. The shifted pressure waves are then subtracted from the pressure waves measured at depth $z_2$, pursuant to block 112, to derive flat sea pressure measurements.

Particle motion measurements may also be compensated to remove rough sea perturbations. More specifically, the lower 30b streamer may contain vertical particle motion sensors, which may be compensated to derive a flat sea vertical particle motion dataset, pursuant to Eq. 4 that is set forth below:

$$Z^{FLAT}(z_2-z_1)=Z(z_2)+(k_z/\rho\omega)W_D(z_2,z_1)P(z_1), \qquad \text{Eq. 4}$$

where "$Z^{FLAT}(z_2-z_1)$" represents the flat sea vertical particle motion measurement; "$Z(z_2)$" represents the rough sea vertical particle motion measurement at depth $z_2$; "$\rho$" represents the mass density; and "$(k_z/\rho\omega)$" represents a filtering that is applied to the product of the $W_D$ operator and the $P(z_1)$ pressure measurements.

Comparing Eqs. 1 and 4, the one-way redatumed pressure is additionally multiplied by the vertical wavenumber divided by the product of the mass density and the radial frequency and then this term is subsequently added, instead of subtracted, to the $Z(z_2)$ vertical particle motion data at depth $z_2$. This filtering applies the obliquity factor to the pressure waves, and the change of sign is because the effective reflection coefficient for the vertical particle velocity is 1, whereas the reflection coefficient for pressure is −1. Therefore, to ensure that the downgoing waves in the $P(z_1)$ pressure measurements cancel the downgoing waves in the $Z(z_2)$ vertical particle motion measurements, the delayed and filtered $P(z_1)$ pressure measurements are added to the $Z(z_2)$ vertical particle motion measurements. Flat sea pressure and vertical particle motion measurements may be subsequently combined by a flat sea, model dependent dephase and sum type technique, such as optimal deghosting.

Figure 3:
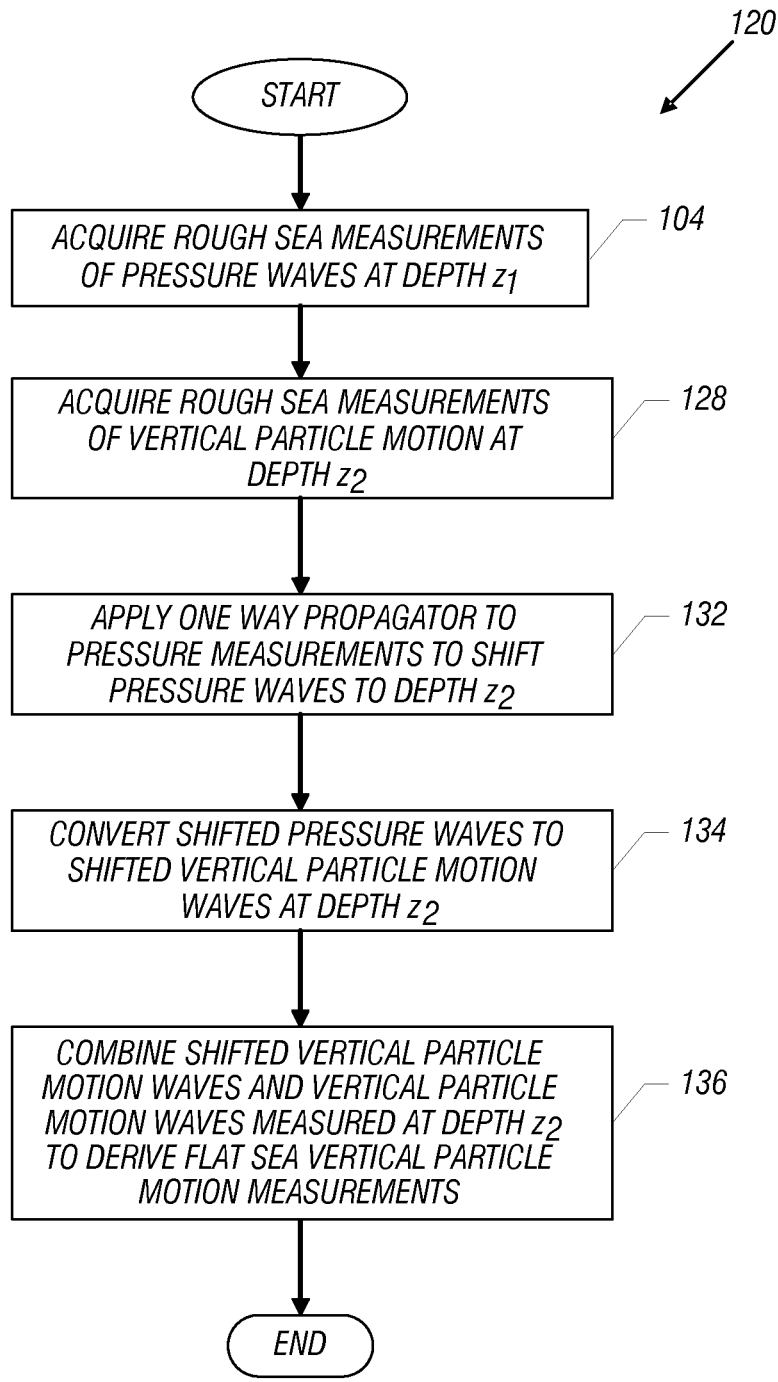
FIG. 3 is a flow diagram depicting a technique to determine flat sea vertical particle motion measurements from pressure and vertical particle motion measurements acquired in the presence of a rough sea.

Referring to FIG. 3, to summarize, a technique 120 to derive flat sea vertical particle motion measurements in accordance with embodiments of the invention includes acquiring rough sea measurements of pressure waves at a first depth $z_1$, pursuant to block 124, and acquiring (block 128) rough sea measurements of vertical particle motion at a depth $z_2$. A one way operator is applied (block 132) to the pressure measurements to shift the pressure waves to depth $z_2$. The shifted pressure waves are then converted (block 134) to shifted vertical particle motion waves at depth $z_2$. The shifted vertical particle motion waves and the vertical particle motion waves measured at depth $z_2$ are combined (block 136) to derive flat sea vertical particle motion measurements.

Rough sea particle motion and pressure measurements may also be processed to derive flat sea crossline particle motion measurements. In this regard, the flat sea crossline particle motion measurements may be derived pursuant to the following equation:

$$Y^{FLAT}(z_2-z_1)=Y(z_2)-(k_y/\rho\omega)W_D(z_2,z_1)P(z_1), \qquad \text{Eq. 5}$$

where "$Y^{FLAT}(z_2-z_1)$" represents the flat sea crossline particle motion measurement; "$Y(z_2)$" represents the crossline particle motion measurements acquired at depth $z_2$; and "$(k_y/\rho\omega)$" represents a filtering operator. As can be noted from Eq. 5, the redatumed pressure is multiplied before subtraction but now with the crossline wavenumber divided by the product of the mass density $\rho$ and the radial frequency $\omega$.

Figure 4:
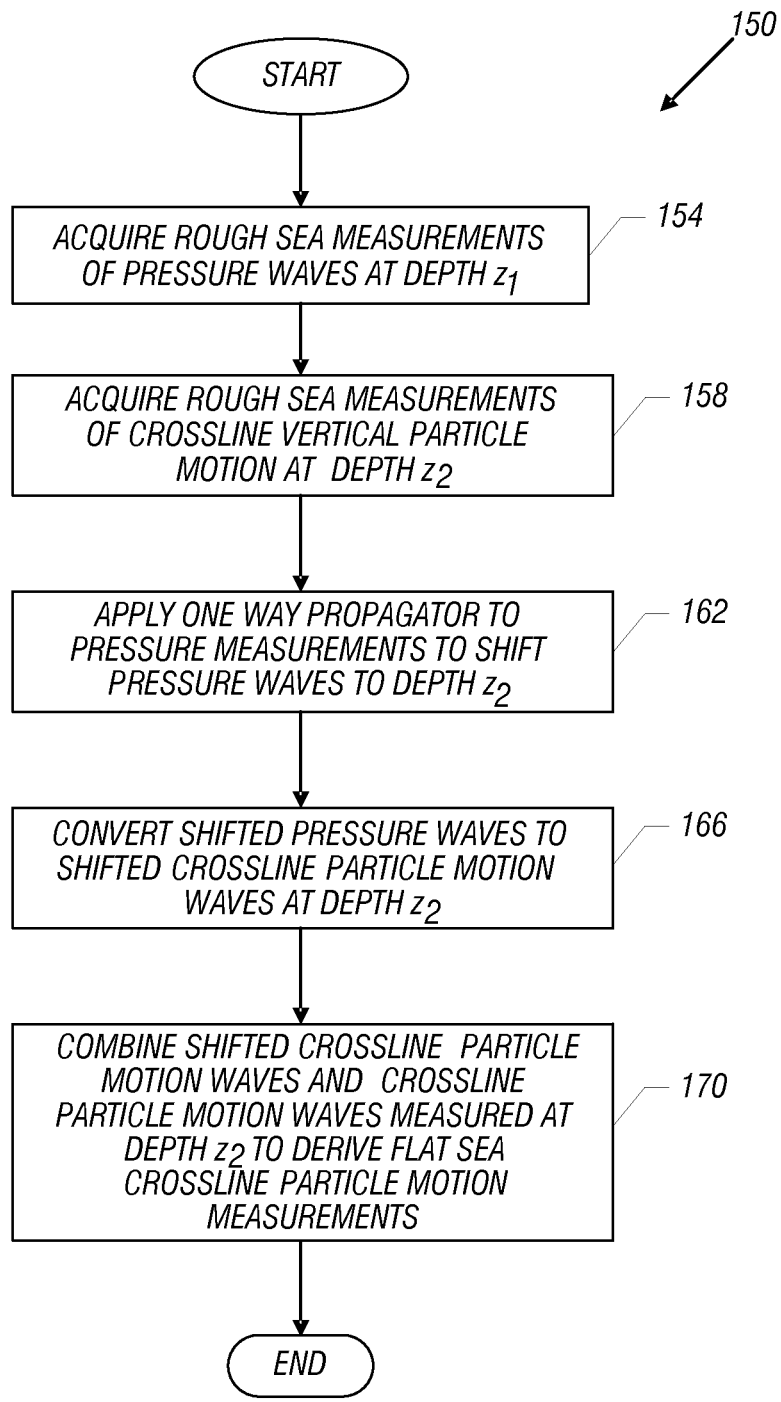
FIG. 4 is a flow diagram depicting a technique to determine flat sea crossline particle motion measurements based on pressure and crossline particle motion measurements acquired in the presence of a rough sea according to an embodiment of the invention.

To summarize, referring to FIG. 4, in accordance with embodiments of the invention, a technique 150 may be used to derive flat sea crossline particle motion measurements. Rough sea measurements of pressure waves are acquired at depth $z_1$, pursuant to block 154, and rough sea measurements of crossline particle motion are acquired at depth $z_2$, pursuant to block 158. A one-way propagator is applied to the pressure measurements to shift the pressure waves to depth $z_2$, pursuant to block 162. The shifted pressure waves are then converted to crossline particle motion waves at depth $z_2$, pursuant to block 166. The shifted crossline particle motion waves and the crossline particle motion waves measured at depth $z_2$ are combined (block 170) to derive flat sea crossline particle motion measurements.

Thus, pressure, vertical particle motion and crossline particle motion measurements, which were acquired in the presence of a rough sea may be processed for purposes of deriving their flat sea counterparts. Turning now to exemplary seismic spreads that allow such processing, FIG. 5 depicts an exemplary streamer spread 180, which may be used to acquire pressure and particle motion measurements in the presence of rough sea (as indicated by a turbulent sea surface 182), in accordance with embodiments of the invention. More specifically, FIG. 5 depicts a crossline view of the streamer spread 180, which includes a set 184 of upper streamers 185 that are spaced apart by $(\frac{2}{3})\Delta Y$ and contain pressure sensors. The seismic spread 180 also includes a lower set 188 of streamers 190, which contain pressure, crossline particle motion and vertical particle motion sensors. The streamers 190 are spaced apart by $2\Delta Y$. Due to this arrangement, the pressure measurements acquired by the sensors on the streamers 185 are relatively unaliased in the crossline direction and therefore, no crossline interpolation is needed before applying the techniques 100, 130 and 150, which are discussed above for purposes of deriving the flat sea data.

When these techniques are applied, flat sea pressure and particle motion data are acquired, which are equivalent to acquiring data from a flat sea acquisition, that is depicted in FIG. 6. More specifically, after conversion to the flat sea data, the data are equivalent to data that are acquired in a flat sea (as denoted by a flat sea surface 192) by a seismic streamer spread 193 (FIG. 6) that has a single layer of seismic sensors 194, which sense pressure, crossline particle motion and vertical particle motion; are located at a depth $\Delta z$ from the surface 192; and are spaced apart in the crossline direction by $2\Delta Y$.

Figure 7:
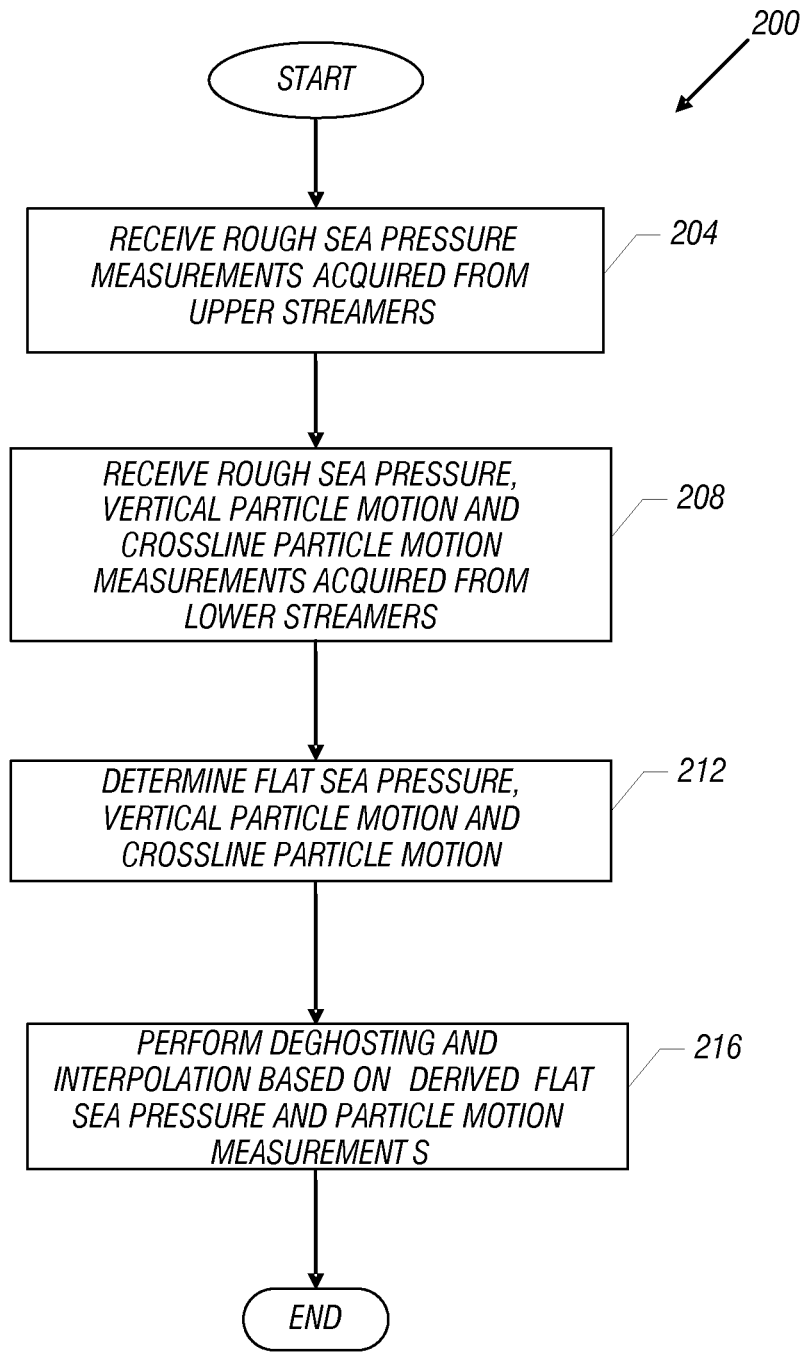
FIGS. 7 and 10 are flow diagrams depicting techniques to determine flat sea pressure and particle motion measurements from pressure and particle motion measurements acquired in the presence of a rough sea according to embodiments of the invention.

Referring to FIG. 7, the data acquired by the seismic spread 180 of FIG. 5 may be processed according to a technique 200 in accordance with some embodiments of the invention. The technique 200 includes receiving rough sea pressure measurements acquired from upper streamers, pursuant to block 204; and receiving rough sea pressure, vertical particle motion and crossline particle motion measurements, acquired from lower streamers, pursuant to block 208. These measurements are processed to determine (block 212) flat sea pressure, vertical particle motion and crossline particle motion measurements; and afterwards, deghosting and interpolation may be performed, pursuant to block 216, on the derived flat sea pressure and particle motion measurements.

Figure 8:
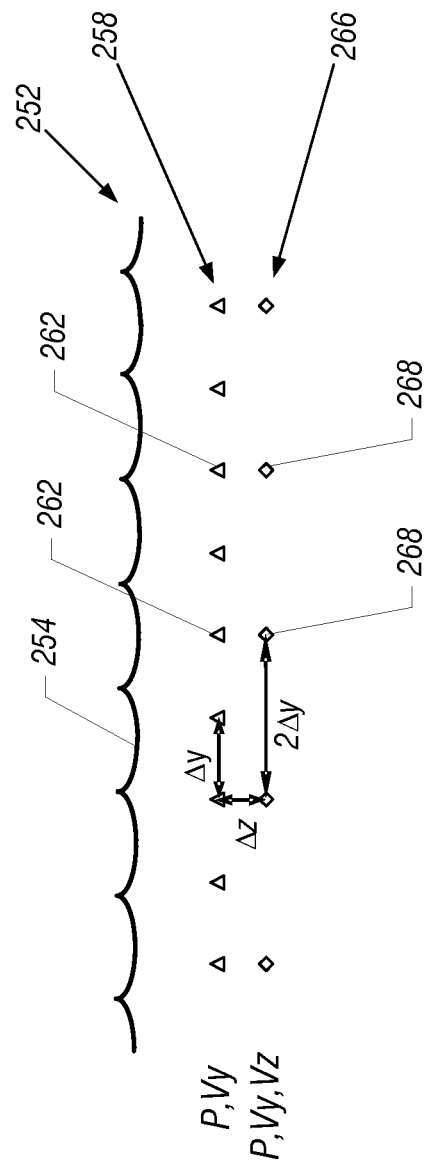

In accordance with some embodiments of the invention, the streamers of the upper set of streamers may be more sparsely spaced apart in the crossline direction than the streamers of the spread 180, e.g., when the upper streamers 30a contain both pressure sensors and crossline particle motion sensors. The pressure data acquired by the upper set of streamers may be constructed at more closely spaced positions between the streamers. More specifically, FIG. 8 depicts an exemplary spread 252 that may be towed in the presence of a rough sea (as indicated by a rough sea surface 254). In general, an upper set of streamers 258 for the spread 252 includes streamers 262 that are generally separated by a distance ΔY in the crossline direction. This is to be compared to the upper set of streamers of the spread that is depicted in FIG. 5. The ΔY spacing is not sufficient to convert the crossline particle motion data recorded at the lower streamers into the flat sea counterpart; however, the upper streamers 262 contain pressure and crossline particle motion sensors to acquire both pressure and crossline particle motion measurements, which allows the construction of pressure measurements at crossline locations, other than the actual locations of the streamers 262. The seismic spread 252 also includes a lower set 266 of streamers 268, which are spaced apart by 2ΔY. The lower streamers 268 of the lower set 266 for this example, contain pressure sensors, crossline particle motion sensors and vertical particle motion sensors, which acquire pressure measurements, crossline particle motion measurements and vertical particle motion measurements.

Figure 9:
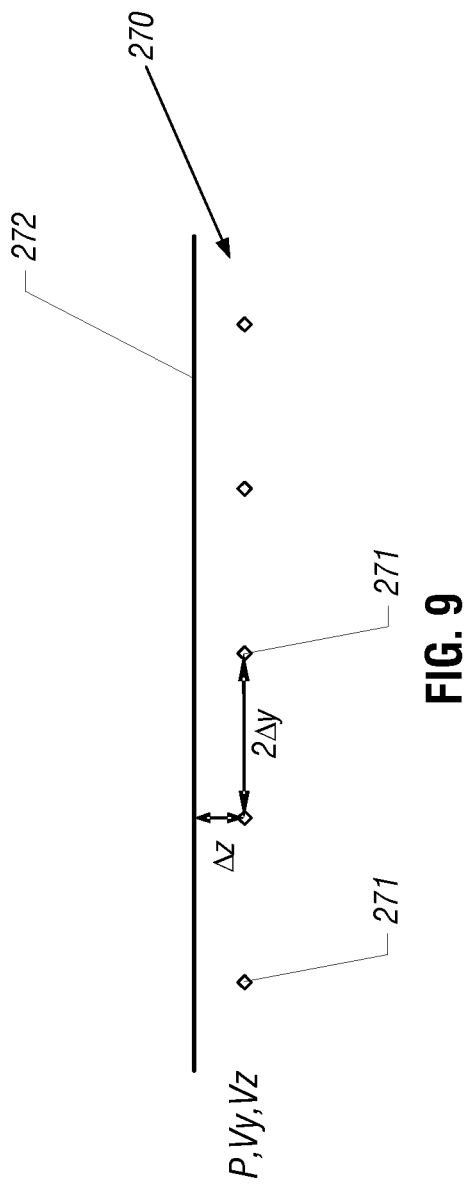
FIG. 9 is an illustration of a streamer spread in a flat sea, which is equivalent to the streamer spread of FIG. 8 when rough sea-to-flat sea processing techniques are used according to an embodiment of the invention.

Because flat sea pressure, crossline particle motion and vertical particle motion measurements may be derived from the data acquired by the spread 252, the resulting flat sea datasets are the same as datasets acquired by a seismic streamer spread 270 (see FIG. 9) that is towed in the presence of a flat sea (as depicted by the flat sea surface 272). In this regard, the resulting flat sea data is equivalent to data acquired by a single level set of streamers 271, which sense pressure, crossline particle motion and vertical particle motion; and are separated by a crossline distance 2ΔY.

Figure 10:
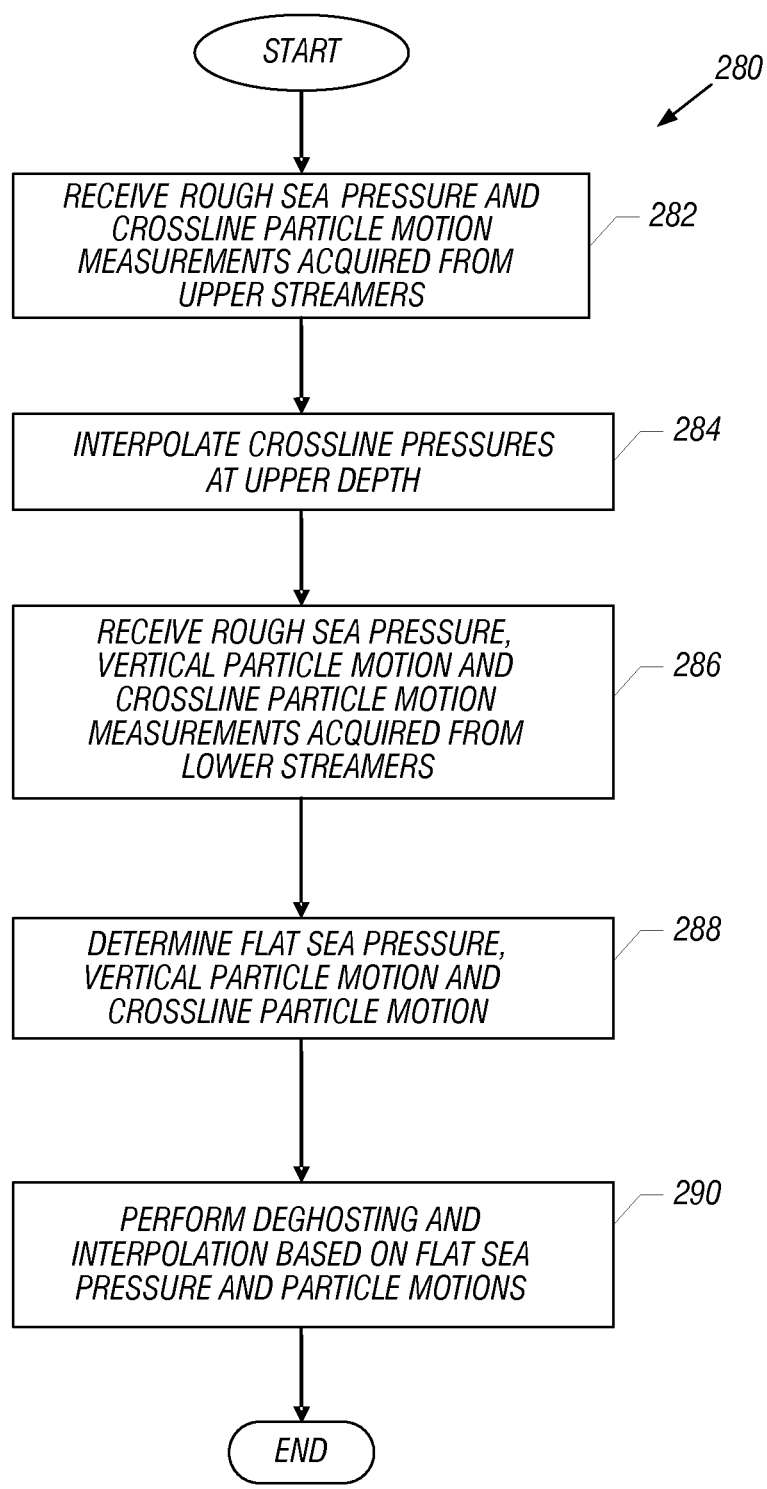

To summarize, a technique 280 (see FIG. 10) may be used in accordance with some embodiments of the invention. Pursuant to the technique 280, rough sea pressure and crossline particle motion measurements are acquired from upper streamers, pursuant to block 282. The crossline pressures are interpolated at the upper depth $z_1$, pursuant to block 284. The technique 280 also includes receiving rough sea pressure, vertical particle motion and crossline particle motion measurements acquired from the lower streamers at depth $z_2$, pursuant to block 286. Pursuant to block 288, flat sea pressure, vertical particle motion and crossline particle motions are determined, pursuant to block 288; and deghosting and interpolation may then be performed, pursuant to block 290, based on the flat sea pressure and particle motions.

Figure 11:
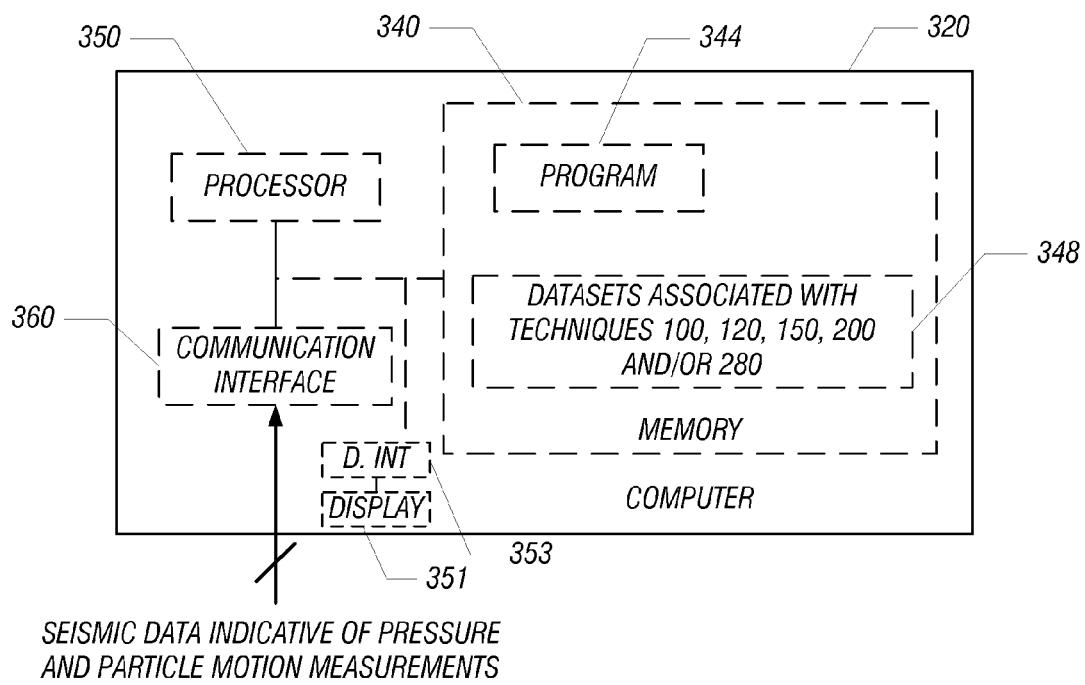
FIG. 11 is a schematic diagram of a processing system according to an embodiment of the invention.

Referring to FIG. 11, in accordance with some embodiments of the invention, a processing system 320 may perform at least part of the techniques that are disclosed herein, such as techniques related to determining the flat sea pressure and particle motion measurements from pressure and particle motion measurements that are acquired in the presence of a rough sea.

The system 320 may be located on one of the streamers 30, on each streamer 30, distributed among the streamers 30, on the seismic source 40, on the survey vessel 30, at a remote land-based facility, etc. The system 320 may also be distributed on one or more of these entities, in accordance with other embodiments of the invention. In accordance with some embodiments of the invention, the system 320 may include a processor 350, such as one or more microprocessors and/or microcontrollers.

The processor 350 may be coupled to a communication interface 360 for purposes of receiving data indicative of seismic measurements, such as pressure measurements, vertical particle motion measurements and crossline particle motion measurements. More specifically, as an example, the pressure measurements may be acquired by both over and under streamers of an over/under streamer spread; and the crossline and vertical particle motion measurements may be acquired by the sensors on the lower streamers of the over/under spread. Additionally, depending on the particular embodiment of the invention, the interface 360 may also receive crossline particle motion measurements acquired by the upper streamers of the over/under spread. Other variations are contemplated and are within the scope of the appended claims.

As a non-limiting example, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets 348 involved with the techniques that are described herein. The memory 340 may store program instructions 344, which when executed by the processor 350, may cause the processor 350 to perform at least part and possibly all of one or more of the techniques that are described herein and display results obtained via the technique(s) on the display 374 of the system 320, in accordance with some embodiments of the invention. As shown in FIG. 11, the system 320 may include a display interface 370 that couples the display device 374 to the system 320.

Other embodiments are contemplated and are within the scope of the appended claims. For example, in accordance with some embodiments of the invention, the spread of seismic streamers may not include particle motion sensors. Instead, the spread may be an over/under streamer, for example, which contains pressure sensors that acquire pressure measurements which are then subsequently processed for purposes of deriving particle motion data. Therefore, the systems and techniques that are described herein may be applied to particle motion, regardless of whether the particle motion is directly acquired by sensors of the streamer spread or derived by processing seismic data acquired by the sensors. Thus, the techniques 100, 120, 150, 200 and/or 280, which are described herein may be performed using particle motion data, regardless of whether the particle motion data is acquired directly from particle motion sensors of the seismic spread or derived from seismic measurements acquired by the spread's sensors. Thus, many variations are contemplated and are within the scope of the appended claims.

Other embodiments are contemplated and are within the scope of the appended claims. For example, in accordance with other embodiments of the invention, the above-described streamers 30a and 30b may be juxtaposed so that the streamers that have the more densely-spaced sensors are the lower set of streamers. Thus, it is irrelevant whether the denser pressure spread is towed on top or below the sparser multi-component spread.

As an example of another embodiment of the invention, described above are embodiments in which the downgoing pressure waves indicated by the pressure measurements $P(z_1)$ are shifted, or delayed, to depth $z_2$. Alternatively, in accordance with other embodiments of the invention, the conjugate (time-reverse) of the redatuming operator may be used to advance, or shift forward, the upgoing pressure waves indicated by the pressure measurements $P(z_2)$ to depth $z_1$ so that these shifted measurements may be subsequently filtered and added/subtracted from the measurements at depth $z_1$. This results in the unperturbed upgoing wavefield being subtracted out and introduces as a pseudo flat sea notch to the rough sea-perturbed downgoing waves. These alternative pseudo measurements may be jointly interpolated (and deghosted) using a flat sea ghost model in the same manner that is described above for the pseudo flat sea measurements.

As yet another example of additional embodiments of the invention, particle motions other than particle velocities may be compensated for purposes of removing rough sea perturbations. Thus, although the equations that are set forth above, such as Eqs. 4 and 5, discuss transformations that are applied to particle velocities, as appreciated by one of skill in the art, the equations may be correspondingly adapted for vertical and crossline particle motion measurements, such as vertical particle displacement or vertical particle acceleration and crossline particle displacement or crossline particle acceleration. As additional examples, the equations may further be adapted for corresponding transformations in the case where vertical pressure and crossline pressure gradients are measured. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method for processing seismic data acquired in a survey conducted in the presence of a rough sea, comprising:
    receiving a first dataset derived from data acquired by seismic sensors of a first set of least one streamer generally towed at a first depth in the survey, the first dataset representing at least pressure measurements;
    receiving a second dataset derived from data acquired by seismic sensors of a second set of at least one streamer generally towed at a second depth different than the first depth in the survey, the second dataset representing at least crossline particle motion measurements containing a rough sea perturbation component; and
    determining crossline particle motion measurements in the presence of a relatively flat sea surface based at least in part on the crossline measurements represented by the second dataset and the pressure measurements, the determining comprising:
        applying a one way propagator to the pressure measurements represented by the first dataset to derive crossline article motion measurements at the second depth substantially containing the rough sea perturbation component; and
        combining the derived crossline particle motion measurements at the second depth with crossline measurements indicated by the first dataset to determine the crossline article motion measurements in the presence of a relatively flat sea surface.

2. The method of claim 1, further comprising:
    crossline constructing at least some of the pressure measurements indicated by the first dataset based on pressure measurements acquired by the seismic sensor of the first set of at least one streamer.

3. The method of claim 2, further comprising:
    further basing the crossline construction on crossline particle motion measurements acquired by the seismic sensors of the first set of at least one streamer.

4. The method of claim 1, further comprising:
    determining vertical particle motion measurements in the presence of a relatively flat sea surface based at least in part on vertical measurements indicated by the second dataset and the pressure measurements indicated by the first dataset.

5. The method of claim 1, further comprising:
    performing deghosting and interpolation based at least in part on the determined crossline particle motion measurements.

6. The method of claim 1, wherein the at least one streamer of the first set and the at least one streamer of the second set are arranged in an over/under configuration.

7. A system to process seismic data acquired in a survey conducted in the presence of a rough sea, the system comprising:
    an interface to:
        receive a first dataset derived from data acquired by seismic sensors of a first set of least one streamer generally towed at a first depth in the seismic survey, the first dataset representing at least pressure measurements; and
        receive a second dataset derived from data acquired by seismic sensors of a second set of at least one streamer generally towed at a second depth different than the first depth in the seismic survey, the second dataset representing at least crossline particle motion measurements containing a rough sea perturbation component; and
    a processor to:
        process the first and second datasets to apply a one way propagator to the pressure measurements represented by the first dataset to derive crossline particle motion measurements at the second depth substantially containing the rough sea perturbation component; and
        combine the derived crossline particle motion measurements at the second depth with crossline measurements indicated by the first dataset to determine crossline particle motion measurements in the presence of a relatively flat sea surface.

8. The system of claim 7, wherein the processor is adapted to:
    crossline construct at least some of the pressure measurements indicated by the first dataset based on pressure measurements acquired by the seismic sensor of the first set of at least one streamer.

9. The system of claim 8, wherein the processor is adapted to:
    further base the crossline construction on crossline particle motion measurements acquired by the seismic sensors of the first set of at least one streamer.

10. The system of claim 7, wherein the processor is adapted to:
determine vertical particle motion measurements in the presence of a relatively flat sea surface based at least in part on vertical measurements indicated by the second dataset and the pressure measurements indicated by the first dataset.

11. The system of claim 7, wherein the processor is adapted to:
perform deghosting and interpolation based on the determined crossline particle motion measurements.

12. An article comprising a non-transitory computer readable storage medium to store instructions that when executed by a computer cause the computer to:
receive a first dataset derived from data acquired by seismic sensors of a first set of least one streamer generally towed at a first depth in a seismic survey conducted in the presence of a rough sea, the first dataset representing at least pressure measurements;
receive a second dataset derived from data acquired by seismic sensors of a second set of at least one streamer generally towed at a second depth different than the first depth in the seismic survey, the second dataset representing at least crossline particle motion measurements containing a rough sea perturbation component;
apply a one way propagator to the pressure measurements represented by the first dataset to derive crossline particle motion measurements at the second depth substantially containing the rough sea perturbation component; and
combine the derived crossline particle motion measurements at the second depth with crossline measurements indicated by the first dataset to determine the crossline particle motion measurements in the presence of a relatively flat sea surface.

13. The article of claim 12, the storage medium storing instructions that when executed cause the computer to:
crossline construct at least some of the pressure measurements indicated by the first dataset based on pressure measurements acquired by the seismic sensor of the first set of at least one streamer.

14. The article of claim 13, the storage medium storing instructions that when executed cause the computer to:
further base the crossline construction on crossline particle motion measurements acquired by the seismic sensors of the first set of at least one streamer.

15. The article of claim 12, the storage medium storing instructions that when executed cause the computer to:
determine vertical particle motion measurements in the presence of a relatively flat sea surface based at least in part on vertical measurements indicated by the second dataset and the pressure measurements indicated by the first dataset.

16. The article of claim 12, the storage medium storing instructions that when executed cause the computer to:
perform deghosting and interpolation based on the determined crossline particle motion measurements.

17. A method comprising:
receiving data received from seismic sensors of a spread of seismic streamers towed in a survey conducted in the presence of a rough sea, the data representing a plurality of pressure measurements and a plurality of particle motion measurements and at least two of the streamers being towed in the survey at different depths;
processing the data to generate a dataset indicative of pressure and vertical particle motion measurements conducted in the presence of a relatively flat sea surface, the processing comprising:
applying a one way propagator to the pressure measurements of the plurality of pressure measurements acquired by sensors of one of the streamers towed at a first depth to derive crossline particle motion measurements corresponding to a depth other than the first depth at which another one of the streamers was towed; and
determining crossline particle motion measurements in the presence of a relatively flat sea based at least in art on the plurality of crossline particle motion measurements and the derived crossline article motion measurements; and
based on the dataset, performing interpolation and deghosting.

18. The method of claim 17, wherein the act of performing interpolating and deghosting comprises performing crossline interpolation.

19. The method of claim 17, wherein the spread of seismic streamers comprises streamers towed at different depths.

20. The method of claim 17, further comprising:
towing the spread of seismic streamers in the survey.

* * * * *